US012560299B2

(12) United States Patent
Gattwinkel et al.

(10) Patent No.: US 12,560,299 B2
(45) Date of Patent: Feb. 24, 2026

(54) LIGHTING DEVICE FOR VEHICLES

(71) Applicant: Hella GmbH & Co. KGaA, Lippstadt (DE)

(72) Inventors: Marcus Gattwinkel, Lippstadt (DE); Burkhard Peitz, Paderborn (DE); Dirk Wilmes, Geseke (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 18/746,389

(22) Filed: Jun. 18, 2024

(65) Prior Publication Data

US 2024/0426450 A1 Dec. 26, 2024

(30) Foreign Application Priority Data

Jun. 21, 2023 (DE) ........................ 102023116226.8

(51) Int. Cl.

| | |
|---|---|
| ***F21S 43/239*** | (2018.01) |
| ***F21S 43/245*** | (2018.01) |
| ***F21S 43/249*** | (2018.01) |

(52) U.S. Cl.

CPC .......... *F21S 43/239* (2018.01); *F21S 43/245* (2018.01); *F21S 43/249* (2018.01)

(58) Field of Classification Search

CPC .............................. F21S 43/239; F21S 43/245

See application file for complete search history.

(56) References Cited

U.S. PATENT DOCUMENTS

| | | | | |
|---|---|---|---|---|
| 9,476,552 | B2 * | 10/2016 | Myers | F21S 8/026 |
| 2012/0236597 | A1 * | 9/2012 | Liao | F21V 29/70 362/218 |
| 2014/0140091 | A1 * | 5/2014 | Vasylyev | G02B 6/0065 362/606 |
| 2015/0029744 | A1 * | 1/2015 | Van Ostrand | G02B 6/0038 362/346 |
| 2015/0196194 | A1 * | 7/2015 | Wu | A61B 1/00142 600/125 |
| 2015/0370000 | A1 * | 12/2015 | Wilcenski | G02B 6/0065 362/606 |
| 2017/0322350 | A1 * | 11/2017 | Montagne | G02B 5/0221 |
| 2019/0377123 | A1 * | 12/2019 | Boerner | E06B 3/6715 |
| 2020/0225402 | A1 * | 7/2020 | Ihas | G02B 6/0046 |
| 2021/0129481 | A1 * | 5/2021 | Dubrow | G02F 1/133611 |

FOREIGN PATENT DOCUMENTS

| | | | |
|---|---|---|---|
| DE | 102019133693 | A1 | 6/2021 |
| KR | 20130064138 | A | 6/2013 |
| WO | 2019227688 | A1 | 12/2019 |

* cited by examiner

*Primary Examiner* — Christopher E Dunay

(74) *Attorney, Agent, or Firm* — Husch Blackwell LLP

(57) ABSTRACT

A lighting device for vehicles contains a flat optical waveguide, which has opposing flat sides and narrow sides connecting them, with numerous microstructure elements on a flat side of the optical waveguide. A number of light sources are positioned on one of the narrow sides of the optical waveguide, and a number of optical films are positioned on the light emission side of the optical waveguide. The optical films have an optical structure for deflecting light on the light emission side. At least one optical film on the side where the light enters has a structure for counteracting capillary effects.

16 Claims, 2 Drawing Sheets

LIGHTING DEVICE FOR VEHICLES

CROSS REFERENCE

This application claims priority to German Application No. 10 2023 116226.8, filed Jun. 21, 2023, the entirety which is hereby incorporated by reference.

FIELD OF THE INVENTION

The invention relates to a lighting device for vehicles that has a flat optical waveguide with opposing flat sides and narrow sides connecting them, with numerous microstructure elements on one of the flat sides of the optical waveguide, and a number of optical films on a light emission side of the optical waveguide, which have an optical structure for deflecting light on the light emission sides thereof.

BACKGROUND OF THE INVENTION

DE 10 2019 133 693 A1 discloses a lighting device for vehicles that has a flat optical waveguide with light sources populating a narrow side thereof, which has numerous microstructure elements on the light emission side. These result in the light entering the optical waveguide exiting this light emission surface in the main beam direction. This results in a relatively large light emission surface for generating a signal.

WO 2019/227688 A1 discloses a lighting device for vehicles that has a flat optical waveguide populated with light sources on a narrow side thereof, in which the optical waveguide has numerous microstructure elements through which light is emitted on the light emission surface. There are a number of optical films on the light emission surface that have an optical structure with which the emitted light is diffused in a defined manner. The at least one optical film can have prism elements or diffusion elements forming the optical structure on the front side of the film in the direction light is emitted. The diffusion obtained with the optical films is limited, however, in that undesired capillary effects can occur due to electrostatic charges because the smooth sides of the films face one another, or the optical waveguide. These result in disruptive spots in the light emission surface of the lighting device.

BRIEF SUMMARY OF THE INVENTION

The object of the present invention is to therefore improve a lighting device for vehicles that has a flat optical waveguide with at least one film adjacent to it, such that a homogenous light emission is obtained in a simple manner.

This problem is solved by the invention, characterized in that at least one optical film has a structure for counteracting capillary effects on the light entry side.

The particular advantage with the invention is that films, flat optical waveguides, or glass panels, which have an optical structure on only one side and a smooth and/or polished surface on the other side, can be readily placed against one another or laminated, without affecting the light deflection obtained with the optical structure. The formation of a structure for counteracting capillary effects on the smooth sides prevents local disruptions or impairments of the effects obtained with the optical structure caused by capillary effects when different films, optical waveguides, or glass panels are placed against one another. The anti-capillary effect structure according to the invention prevents undesired capillary effects occurring when two smooth surfaces are placed against one another, and also does not impact the optical effects of the other surfaces that have optical structures. This advantageously results in an improved, homogenous light emission, in which undesired local optical effects are prevented, e.g. emission of an increased local light concentration.

According to a preferred embodiment of the invention, the anti-capillary effect structure is formed by microstructure elements that preferably have a different size and/or lateral extension than the micro-optic elements forming the optical structure. This advantageously ensures that the smooth surfaces do not bear directly on one another, and that the optical effects of the optical structure are not altered or heightened. The microstructure elements forming the anti-capillary effect structure are designed to homogenize or parallelize the light entering the film and/or glass panel.

According to another embodiment of the invention, numerous microstructure elements are placed on the back of the optical waveguide lying opposite the surface of the optical waveguide forming the light emission surface, which form emission elements. They deflect the entering light such that it strikes the light emission surface of the optical waveguide at a relatively steep angle, where it is then emitted. The light emission surface is smooth and free of diffusion elements. The light emission surface can be a polished surface.

According to one version of the invention, there is a reflective surface at the back of the optical waveguide. This ensures that light emitted from the back of the optical waveguide is reflected back and can then exit the light emission surface. This increases the light output.

According to one version of the invention, there is a two-part housing frame for the flat waveguide and the numerous optical films. The optical components can also include a reflective surface and a glass panel. Both the front and back frame parts are U-shaped, the thickness of which is fitted to the optical components. A slot is formed where the U-shaped frame parts are connected, in which a light source unit containing the light sources can be partially accommodated or secured. This advantageously results in a compact flat waveguide module.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The lighting device according to the invention can be a tail lamp forming taillights or brake lights. The lighting device can also be used for turn signal lights or daytime running lights.

Figure 1:
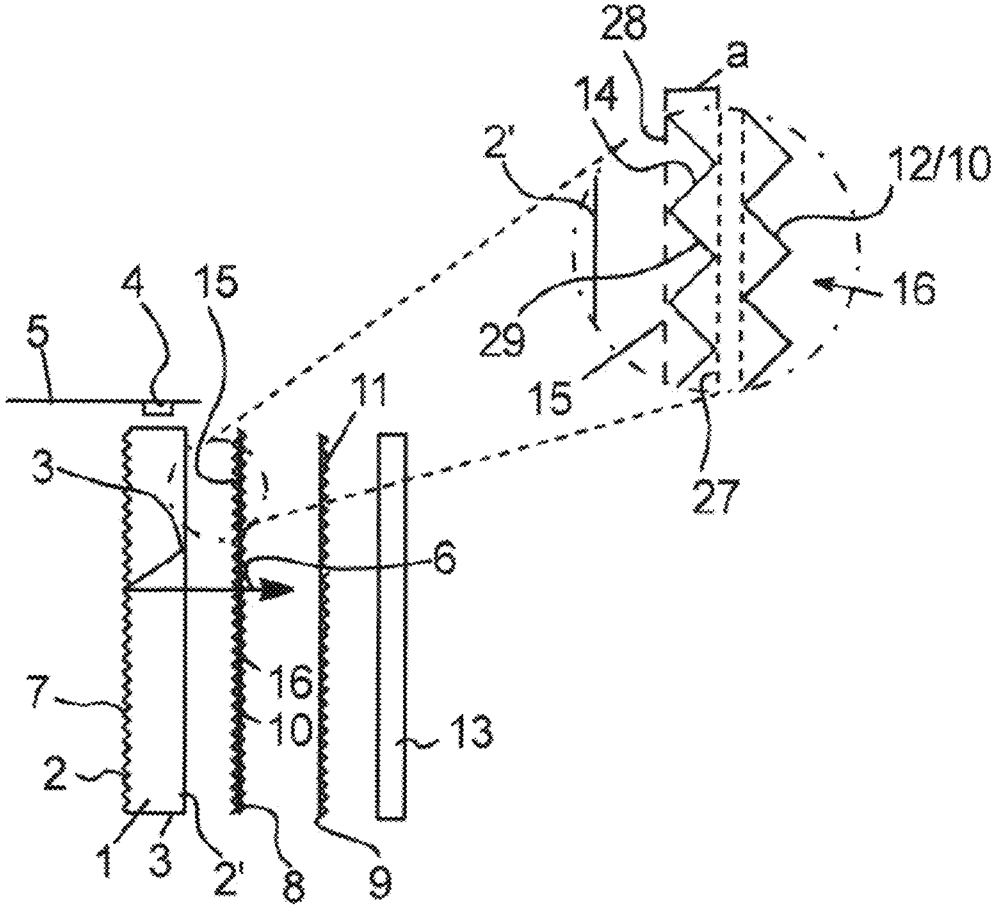
FIG. 1 shows a schematic side view of a first embodiment of the lighting device, in which the optical components are spaced apart for illustrative purposes.

In a first embodiment of the invention, shown in FIG. 1, the lighting device contains a flat optical waveguide 1, which has opposing flat sides 2, 2' and narrow sides 3 that connect them. One of the narrow sides 3 is populated with numerous light sources 4 arranged in a row or a straight line on a printed circuit board 5.

The light sources 4 emit light 6, which enters the optical waveguide 1 at one of the narrow sides 3, and undergoes total internal reflection at the opposing flat sides 2, 2'. To emit the light 6 entering the optical waveguide at the front side 2' forming the light emission surface, the back 2 has an optical structure comprising numerous bumps in the form of microstructure elements 7. The light 6 striking the microstructure elements 7 undergoes total internal reflection, such that it can exit the front side 2' of the optical waveguide 1.

The front side 2' (light emission surface) is smooth. By way of example, the front side 2' is polished.

The optical waveguide 1 in the present exemplary embodiment is flat, such that the front side 2' is parallel to the back side 2.

A first optical film 8 and second optical film 9 are adjacent to the light emission side of the optical waveguide 1, each of which have an optical structure 10 and 11 that deflects or diffuses light on the light emission side. The optical structures 10, 11 can be micro-optical structures with numerous microstructure elements 12. These elements can be prismatic, and/or concave, and/or convex.

A glass panel 13 is placed in front of the first optical film 8 and second optical film 9 in the direction in which light is emitted, which has smooth opposing flat sides. By way of example, the glass panel 13 can be colored, e.g. red, if the lighting device is intended as a tail light or brake light.

To prevent undesired capillary effects in the form of undesired irregularities, inhomogeneities, or spots with different colors on the light emission surface of the glass panel 13, the first optical film 8 has an anti-capillary effect structure 14 on the side facing the optical waveguide 1. The anti-capillary effect structure 14 is composed of numerous bumps that are preferably evenly distributed over the back 15 of the first film 8. Consequently, an otherwise smooth back 15 of the first film does lie flat against the smooth front 2' of the optical waveguide.

By way of example, the anti-capillary effect structure 14 can have numerous microstructure elements or a diffractive structure.

The anti-capillary effect structure 14 is placed in relation to the optical structure 10 on the front 16 of the first film such that the diffusion of the light 6 caused by the optical structure 10 remains unaltered. The anti-capillary effect structure 14 is formed by bumps 29 that prevent the first optical film 8 from lying flat against the optical waveguide 1. The anti-capillary effect structure 14 therefore raises the base surface 27 of the back 15 of the first optical film 8, which has bumps 29 forming microstructure elements, away from the smooth surface of the optical waveguide 1 when fully assembled, spacing them apart at the plane formed by the tops of the bumps, that corresponds to the front side 2' of the optical waveguide in the assembled state.

The anti-capillary effect structure 14 is designed such that the light density from the lighting device remains unaltered with respect to that obtained by an arrangement of microstructure elements 7 on the front 2' of the optical waveguide forming emission elements, and a smooth back 15 of the first film 8.

In another embodiment of the invention, the anti-capillary effect structure 14 can cause such a diffusion that in interacting with the optical structure 10 on the front 16 of the first optical film 8, a predefined diffusion of the light 6 is obtained.

By way of example, the bumps 29 on the back 15 can be offset to the optical structure 10 or micro-optic elements 12 on the front 16 of the optical film 8.

The size and/or lateral extension of the bumps 29 of the anti-capillary effect structure 14 is preferably different than that of the microstructure elements 7 on the front 16 of the first optical film 8.

The microstructure elements 7 forming the emission elements are preferably formed during the injection molding process with which the optical waveguide 1 is produced.

The anti-capillary effect structure 14 can be formed by etching, with lasers, or by sandblasting the flat side where light enters (back side 15). The anti-capillary effect structure 14 can also be formed through an erosion process or galvanic corrosion on the flat side where light enters, or the back side 15 of the first film 8.

Figure 2:
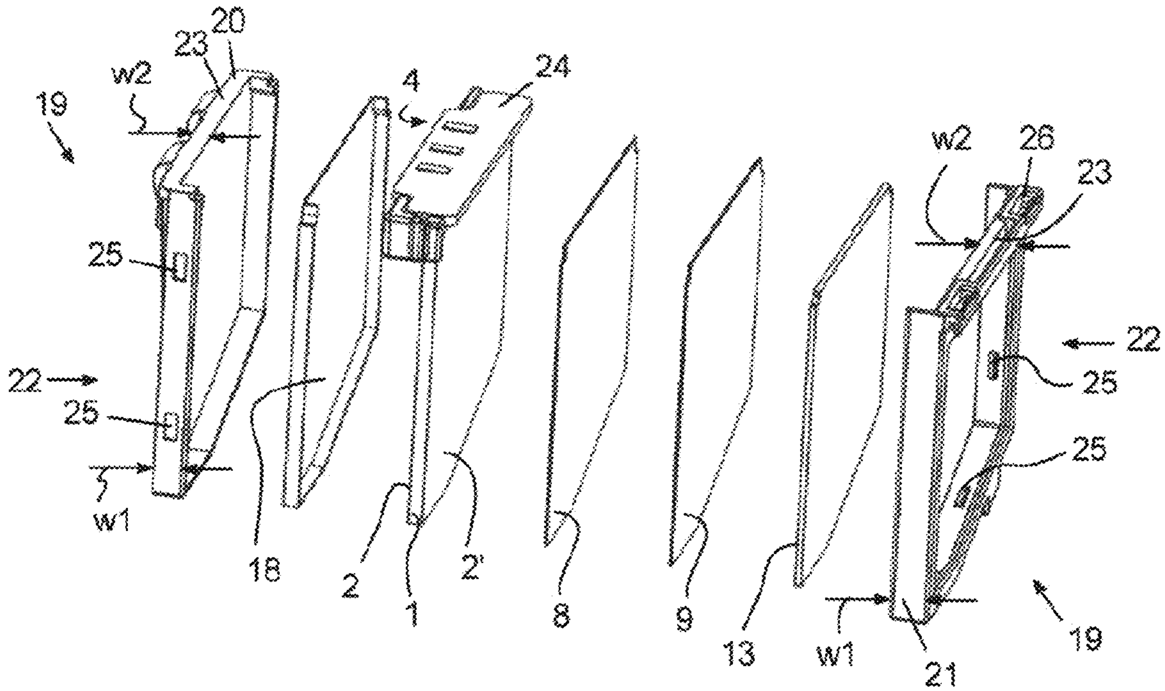
FIG. 2 shows an exploded view of a second embodiment of the lighting device.

A flat optical waveguide is shown in FIG. 2, which has a reflective surface 18 on the back 2 of the flat optical waveguide 1, thus differing from the embodiment shown in FIG. 1. The reflective surface 18 can be white, and reflects the light exiting the back 2 of the optical waveguide 1 back into the optical waveguide 1, which is then emitted directly, or after undergoing total internal reflection, through the front 2' of the optical waveguide 1. This increases the light output.

The optical components, specifically the reflective surface 18, optical waveguide 1, first optical film 8, second optical film 9, and the glass panel 13 are retained in a two-part housing frame 19, formed by a back part 20 and front part 21. Both parts 20, 21 have U-shaped frame segments 22, which overlap and abut one another when assembled. The thickness w1 of the U-shaped segments 22 is such that the optical components 18, 1, 8, 9 and 13 fit snuggly against one another.

There is also a slot 23 formed at the top of the U-shaped segments 22 by the back 20 and front 21 parts, in which the light source unit 24 containing the light sources 4 is accommodated. The thickness w2 at the slot 23 is such that the light source unit 24 containing the light sources 4 fits into the slot 23 between the back 20 and front 21 parts of the frame. The U-shaped frame segments 22 formed by the back 20 and front 21 parts of the frame has releasable fasteners 25 for attaching the back part 20 of the frame to the front 21.

The slot 23 has fasteners 26 for attaching the light source unit 24 to the housing frame 19.

The two-part housing frame 19 results in a compact design for the flat optical waveguide module.

The light sources 4 are preferably LEDs that are evenly distributed in a row.

LIST OF REFERENCE SYMBOLS

1 flat optical waveguide
2, 2' flat sides
3 narrow sides
4 light sources
5 printed circuit board
6 light
7 microstructure elements
8 first optical film
9 second optical film
10 optical structure
11 optical structure
12 micro-optical elements
13 glass panel
14 anti-capillary effect structure
15 back flat side
16 front flat side
17 base surface
18 reflective surface
19 two-part housing frame

20 back frame part
21 front frame part
22 U-shaped frame segment
23 slot
24 light source unit
25 fastener
26 fastener
27 base surface
28 plane
29 bumps
a spacing
w1, w2 thickness

We claim:

1. A lighting device for vehicles, the lighting device comprising:

a flat optical waveguide with opposing flat sides and narrow sides connecting the opposing flat sides, at least one of the flat sides having microstructure elements, wherein one or more light sources are positioned adjacent at least one of the narrow sides of the optical waveguide, wherein one or more optical films are positioned adjacent a light emission side of the optical waveguide, wherein each optical film has an optical structure for deflecting light exiting the optical film, wherein at least one optical film of the one or more optical films has an anti-capillary structure facing the light emission side of the optical waveguide for counteracting capillary effects, and wherein the anti-capillary structure of the at least one optical film comprises bumps and the optical structure of the at least one optical film comprises micro-optical elements, wherein a configuration of the bumps of the anti-capillary structure is different from a configuration of the micro-optical elements of the optical structure.

2. The lighting device according to claim 1, wherein the anti-capillary structure is configured such that diffusion obtained with the optical structure on a light exiting side of the at least one optical film is not diminished.

3. The lighting device according to claim 1, wherein the bumps of the anti-capillary structure have a size and/or lateral extension such that diffusion via the anti-capillary structure is less than 25% of diffusion via the optical structure.

4. The lighting device according to claim 1, wherein the bumps of the anti-capillary structure form a diffractive optical element, the diffractive optical element having a size and/or lateral extension such that diffusion via the diffractive optical element is less than 25% of diffusion via the optical structure.

5. The lighting device according to claim 1, wherein the at least one optical film having the anti-capillary structure abuts a smooth front side of the optical waveguide, the smooth front side defining the light emission side.

6. The lighting device according to claim 1, wherein the microstructure elements are formed during an injection molding process with which the optical waveguide is obtained.

7. The lighting device according to claim 1, wherein a reflective surface is located adjacent the optical waveguide opposite the light emission side.

8. The lighting device according to claim 1, wherein the micro-optical elements of the optical structure are prismatic, and/or concave, and/or convex.

9. The lighting device according to claim 1, wherein the anti-capillary structure is formed on a light entry side of the at least one optical film by etching, with lasers, or by sandblasting.

10. The lighting device according to claim 1, wherein the anti-capillary structure is formed through an erosion process, or galvanic corrosion on a light entry side of the film.

11. The lighting device according to claim 1, further comprising a two-part housing frame, a back part and front part of the housing frame having U-shaped segments with a thickness (w1) that encompass the optical waveguide, the one or more optical films, and at least one glass panel, and wherein a slot is located at a top of an interface between the U-shaped segments for a light source unit containing the one or more light sources.

12. The lighting device according to claim 11, the back part of the housing frame is connected to the front part of the housing frame via fasteners.

13. The lighting device according to claim 11, the light source unit is attached to the housing frame via fasteners at the slot.

14. The lighting device according to claim 1, wherein the one or more light sources are arranged in a row and/or a straight line.

15. The lighting device according to claim 1, wherein the bumps of the anti-capillary structure are offset to the micro-optical elements of the optical structure.

16. The lighting device according to claim 1, wherein a size and/or lateral extension of the bumps of the anti-capillary structure is different than a size and/or lateral extension of the micro-optical elements of the optical structure.

* * * * *